United States Patent [19]

Noetzel et al.

[11] 3,980,614

[45] Sept. 14, 1976

[54] FLAME RETARDING PLASTIC MATERIALS

[75] Inventors: Siegfried Noetzel, Kelkheim, Taunus; Walter Herwig, Neuenhain, Taunus; Rudolf Kern; Werner Lotz, both of Mainz, all of Germany

[73] Assignee: Hoechst Aktiengesellschaft, Frankfurt am Main, Germany

[22] Filed: Oct. 6, 1975

[21] Appl. No.: 620,247

[30] Foreign Application Priority Data

Mar. 14, 1975 Germany............................ 2511185

[52] U.S. Cl. ................. 260/45.9 NC; 260/502.4 P; 260/502.5
[51] Int. Cl.² ............................................. C08J 3/20
[58] Field of Search ................ 260/45.9 NC, 502.5, 260/502.4 P

[56] References Cited
UNITED STATES PATENTS

| | | | |
|---|---|---|---|
| 3,066,140 | 12/1962 | Speziale | 260/45.9 NC |
| 3,067,251 | 12/1962 | Rauhut et al. | 260/561 P |
| 3,270,092 | 8/1966 | Harwood | 260/502.4 P |
| 3,582,510 | 6/1971 | Cannelongo | 260/45.9 |
| 3,709,940 | 1/1973 | Flugel | 260/561 P |

OTHER PUBLICATIONS

Seriya Khimicheskaya vol. 8 pp. 1860 to 1862 (1968).

Stabilization of Polymers and Stabilizer Processes American Chemical Society Publications (1968) pp. 307 to 317.

*Primary Examiner*—V.P. Hoke
*Attorney, Agent, or Firm*—Curtis, Morris & Safford

[57] ABSTRACT

The specification discloses flame retarding plastic materials which contain, as the flame retarding agent, a phosphinic, diphosphinic or tri-phosphinic acid derived from 2-alkyl-2,5-dioxo-1,2-oxaphospholane and an organic monoamine or diamine or triamine, respectively.

4 Claims, No Drawings

FLAME RETARDING PLASTIC MATERIALS

The present invention relates to flame retarding plastic materials.

It is known that carbon compounds of phosphorus may influence the flammability of polymers, and in certain cases they have a good flame retarding effect.

The difficulty of using organo-phosphorus compounds for flameproofing polymers resides in the fact that these compounds often have an insufficient stability under the manufacturing or processing conditions necessary for the polymers, that they are not chemically inert in certain cases, or that they have a too high vapor pressure and thus volatilize under thermal strain put on the polymer, especially at reduced pressure.

It has now been found that phosphinic acids corresponding to the following formulae I, II and III

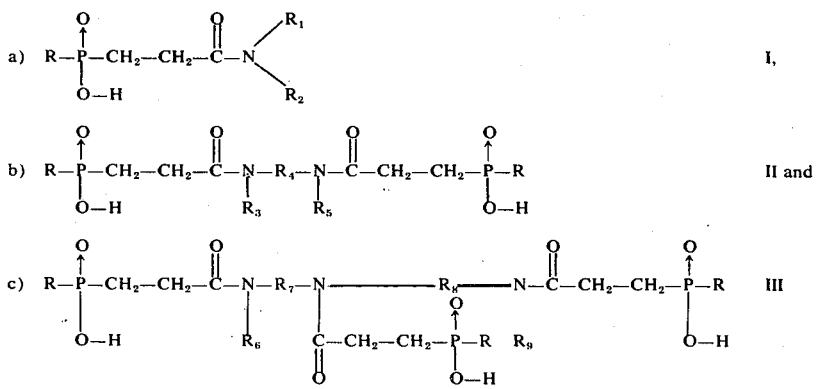

wherein

R is an alkyl radical having from 1 to 8 carbon atoms,
$R_1$ is hydrogen or an open-chain or cyclic alkyl radical having from 1 to 18 carbon atoms, which optionally contains halogen atoms, or an aryl or aralkyl radical optionally being substituted by halogen atoms,
$R_2$ is an open-chain or cyclic alkyl radical having from 1 to 18 carbon atoms, which optionally contains halogen atoms, or an aryl or aralkyl radical optionally being substituted by halogen atoms,
$R_3$ is hydrogen or an open-chain or cyclic alkyl radical having from 1 to 18 carbon atoms, which optionally contains halogen atoms,
$R_4$ is an open-chain alkylene radical having from 1 to 18 carbon atoms, or a cyclic alkylene, arylene, arylalkylene, arylenealkylene or arene-bisalkylene radical having from 1 to 6 carbon atoms in the alkylene radical,
$R_5$, $R_6$, $R_9$ are as defined for $R_3$, and
$R_7$ and $R_8$ are as defined for $R_4$;
the radicals $R_3$, $R_5$, $R_6$ and $R_9$ on the one hand, and $R_4$, $R_7$ and $R_8$ on the other hand being identical or different, are very suitable flameproofing agents for polymers.

The present invention provides polymer molding compositions containing a flameproofing agent, wherein the flameproofing agent is a phosphinic acid or a salt thereof corresponding to the formulae

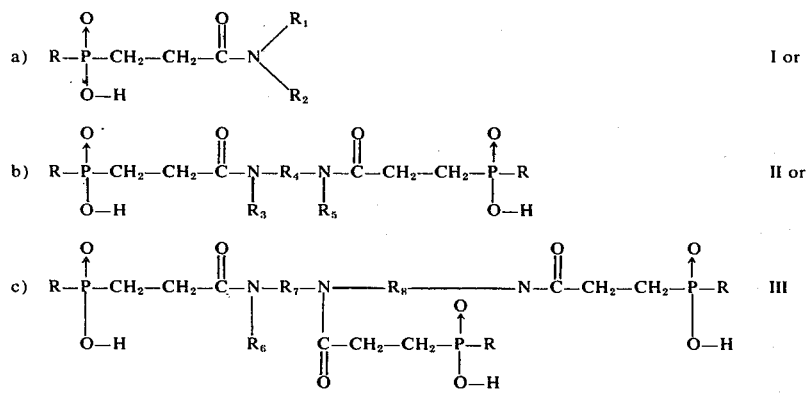

where R, $R_1$, $R_2$, $R_3$, $R_4$, $R_5$, $R_6$, $R_7$, $R_8$ and $R_9$ are as defined above.

Examples of phosphinic acids which may be used in accordance with this invention are the following: the reaction products of a 2-alkyl-2,5-dioxo-1,2-oxaphospholane, for example of 2-methyl-2,5-dioxo-1,2-oxaphospholane, 2-ethyl-2,5-dioxo-1,2-oxaphospholane, 2-propyl-2,5-dioxo-1,2-oxaphospholane, 2-butyl-2,5-dioxo-1,2-oxaphospholane, 2-hexyl-2,5-dioxo-1,2-oxaphospholane or 2-octyl-2,5-dioxo-1,2-oxaphospholane with a. an organic monoamine $NHR_1R_2$, for example methylamine, dimethylamine, ethylamine, diethylamine, propylamine, dipropylamine, butylamine, dibutylamine, 2,3-dibromopropylamine, bis-(2,3-dibromopropyl)-amine, octylamine, dodecylamine, stearylamine, cyclohexylamine, aniline, diphenylamine, 4-chloroaniline, 2,4,6-trichloroaniline, 4-bromoaniline, 2,4,6-tribromoaniline, or b. an organic diamine

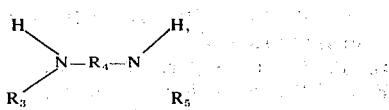

for example ethylenediamine, tetramethylenediamine, hexamethylenediamine, bisaminomethylcyclohexane, bisaminomethylnorbornane, xylylenediamine, or c. an organic triamine

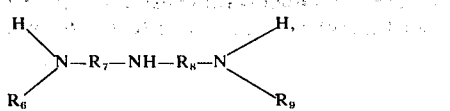

for example diethylenetriamine. The radicals $R_1$ through $R_9$ are as defined above.

The free phosphinic acids are advantageously prepared as follows: equivalent amounts of the phospholane and the amine are heated to a temperature of from 80° to 220°C in the presence or absence of solvents, for example benzene, chloro- or dichlorobenzene. After complete reaction, the reaction product precipitates generally in the form of a crystalline substance which is soluble in sodium hydroxide solution.

The amount of phosphinic acid to be used depends on the kind of polymer and on the degree of flame retarding effect and is generally in a range of from 1.5 to 40, preferably from 2 to 30, and especially from 2 to 25, weight %, calculated on the weight of the polymer.

As polymers which may be flameproofed by means of the phosphinic acids according to this invention, there may be used polyamides, polyurethanes, polyacetals and saturated polyesters, preferably polybutylene terephthalate, homo- and copolymers of olefinically unsaturated monomers, such as ethylene and propylene polymers, polystyrene or styrene/acrylonitrile copolymers. Above all, the cited phosphinic acids may be used for flameproofing linear polyamides obtained from aliphatic dicarboxylic acids having from 4 to 18 carbon atoms and aliphatic diamines having from 4 to 18 carbon atoms, and from aliphatic dicarboxylic acids having from 4 to 18 carbon atoms and/or aromatic dicarboxylic acids having from 7 to 18 carbon atoms and cycloaliphatic diamines having from 6 to 18 carbon atoms, polycaprolactam, polyacetals such as polyformaldehyde or trioxan copolymers and polyolefins such as polyethylene or polypropylene, as well as polybutyleneterephthalate.

A special advantage of the invention resides in the fact that the phosphinic acids and their salts do not adversely affect the processing of the polymers.

The incorporation of the phosphinic acids or their salts is advantageously carried out by mixing them with polymer granules or powder and processing the mixture on an injection molding machine. The polymer granules may also be premixed continuously or batchwise with the phosphinic acids and optionally required further additives, such as dyestuffs, lubricants or stabilizers, and the mixture may then be fed to an extruder for homogenization and processing to strands or ribbons, which are, for example, cooled in a water bath and granulated after solidification. Halogen-free phosphinic acids or phosphinic acid salts may also be incorporated into the polymers by adding them to the starting polymerization batch containing the monomers.

The flame retarding action of the phosphinic acids and their salts added is examined according to ASTM D 635-68 on test specimens having dimensions of 127 × 12.7 × 1.6 mm. The polymer molding compositions of the invention are either self-extinguishing or non-flammable, depending on the kind of polymer and the concentration of the flameproofing agent.

For example, a content of 15 weight % of the phosphinic acid obtained from 2-methyl-2,5-dioxo-1,2-oxaphospholane and 2,4,6-tribromoaniline in polyethylene or polypropylene ensures excellent flame retarding properties.

For sheets (tested according to MVSS (Motor Vehicle Safety Standard) 302) or small ribbons (tested according to German Industrial Standard DIN 53 806) of polypropylene, somewhat lower concentrations of the phosphinic acids according to this invention are necessary as compared to those of polyethylene, to attain the same flameproofing effect.

In many cases, the phosphinic acids according to this invention have a better flame retarding action than their salts, as claimed in the copending application Ser. No. 620,142 claiming priority from German Patent Application P 24 47 726.7. Polyethylene or polypropylene sheets containing 5 weight % of the phosphinic acid obtained from 2-methyl-2,5-dioxo-1,2-oxaphospholane and 2,4,6-tribromoaniline resist to the combustion test according to MVSS 302 required for such sheets, whereas identical sheets containing 5 weight % of the corresponding sodium or zinc salt of the above acid do not resist to the MVSS 302 test.

The phosphorus compounds contained in the flame retarding polymer molding compositions of the invention are thermostable and do not adversely affect the polymers neither during their preparation nor during their processing, and they are non-volatile under the preparation and processing conditions.

Besides the phosphinic acids, there may be added to the molding compositions of the invention also inorganic fiber materials in usual amounts, for example glass fibers, or fibers of quartz, asbestos or carbon. The thickness of especially the glass fibers is advantageously in a range of from 0.1 to 50, preferably from 3 to 15, microns, and their length in a range of from 0.01 to 5, preferably from 0.05 to 1, mm. The amount of the fibers is advantageously up to 50, preferably from 10 to 30, weight %, calculated on the polymer molding composition of the invention.

The polymer molding compositions of the invention may also contain further known additives, for example stabilizers, lubricants, dyestuffs, mold release agents, antistatics or fillers.

The following examples illustrate the invention.

EXAMPLE 1

Preparation of

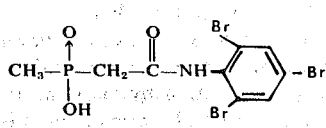

A mixture of 136 g of 2-methyl-2,5-dioxo-1,2-oxaphospholane and 330 g of 2,4,6-tribromoaniline in 1200 ml of o-dichlorobenzene was heated for 4 hours to 180° – 200°C in a glass flask with agitation. After cooling, the precipitated crystalline reaction product was filtered off, washed with ethanol and dried in a vacuum drying cabinet under a nitrogen atmosphere at 100°C and 200 mm Hg. the product has a melting point of 250°C.

ANALYSIS

Calculated: 25.86% C, 2.36% H, 3.01% N, 51.7% Br
Found: 25.9% C, 2.4%, H, 2.9% N, 52.1% Br EXAMPLE 2a After grinding and screening through a sieve having a mesh size according to German Industrial Standard DIN 4188 No. 20, a polyamide prepared from one mol of terephthalic acid, one mol of a bisaminomethylnorbornane mixture and 25 weight % of ε-caprolactam was homogeneously blended with 20 weight %, relative to the polyamide weight, of the phosphinic acid of Example 1, and compression molded to plates having a thickness of 1.6 mm (RSV, reduced specific viscosity, = 1.09 dl/g) at 235°C and under a pressure of from 5 to 100 atm/gage. From the plates, test specimens having dimensions of 127 × 12.7 × 1.6 mm were cut which were subjected to the ASTM D 635–68 test in order to prove the flame retarding properties. The result is indicated in Table 1.

EXAMPLE 2b (Comparative Example)

The polyamide of Example 2a without addition of the phosphinic acid of Example 1 was processed to test specimens and examined according to ASTM D 635–68. The result is indicated in Table 1.

The bisaminomethylnorbornane mixture used in Examples 2a and 2b was obtained according to known methods by hydroformylation of 2-cyano-bicyclo-[2,2,1]-heptene-5 and subsequent reduction amination (reaction with ammonia and hydrogen) of the formyl compound to form the bis-(aminomethyl)-bicyclo[2,2,1]-heptane mixture.

EXAMPLE 3a

A polyamide prepared from 1 mol of terephthalic acid, 1 mol of 1,3-bisaminomethyl-cyclohexane (substantially in trans-form) and 30 weight % of ε-caprolactam was ground, screened (see Example 2a), homogeneously blended with 15 weight % of the phosphinic acid of Example 1, calculated on the polyamide weight, and compression molded as indicated in Example 2a (RSV 0.98 dl/g). The test specimens were tested according to ASTM D 635–68. The result is indicated in Table 1.

EXAMPLE 3b (Comparative Example)

The polyamide of Example 3a without addition of the phosphinic acid of Example 1 was testing according to ASTM D 635–66. The result is indicated in Table 1.

EXAMPLE 4a

Polyethylene powder was homogeneously blended with 15 weight %, calculated on the polyethylene weight, of the phosphinic acid of Example 1, and test specimens were manufactured according to Example 2a (RSV 2.3 dl/g), which were tested according to ASTM D 635–68.

EXAMPLE 4b

The polyethylene of Example 4a, without addition of the phosphinic acid of Example 1, was tested according to ASTM D 635–68.

EXAMPLE 5a

Polypropylene powder was homogeneously blended with 15 weight % of the phosphinic acid of Example 1, calculated on the polypropylene weight, and molded plates and test specimens were manufactured as indicated in Example 2a (RSV 2.14 dl/g). The test specimens were examined according to ASTM D 635–68.

EXAMPLE 5b (Comparative Example)

The polypropylene of Example 5a, without addition of the phosphinic acid of Example 1, was tested according to ASTM D 635–68.

EXAMPLE 6a

A polyamide prepared from 1 mol of terephthalic acid, 1 mol of 1,3-bisaminomethyl-cyclohexane (substantially in trans-form) and 30 weight % of adipic acid-hexamethylenediamine salt was ground, screened (see Example 2a) and homogeneously blended with 20 weight %, calculated on the polyamide weight, of a phosphinic acid obtained from 2-methyl-2,5-dioxo-1,2-oxa-phospholane and di-n-butylamine (prepared according to the method indicated in Example 1 at a temperature of 120°–140°C); from the molding composition so obtained, plates and test specimens (RSV 1.05 dl/g) were manufactured according to the method of Example 2a. The test specimens were examined according to ASTM D 635–68.

EXAMPLE 6b (Comparative Example)

The polamide of Example 6a, without addition of the phosphinic acid of Example 6a, was processed to test specimens which were examined according to ASTM D 635–68.

EXAMPLE 7a

Polybutyleneterephthalate in ground form was homogeneously blended with 10 weight % of the phosphinic acid of Example 1, calculated on the weight of polybutyleneterephthalate, and test specimens were manufactured as indicated in Example 2a (RSV 0.84 dl/g), which specimens were examined according to ASTM D 635–68.

EXAMPLE 7b (Comparative Example)

Polybutyleneterephthalate of Example 7a, without addition of the phosphinic acid of Example 1, was tested according to ASTM D 635–68.

TABLE 1

| Example | Polymer | Flame retarding agent (FRA) | weight % FRA | compression molded plate RSV [dl/g] | Result according to ASTM D 635–68 |
|---|---|---|---|---|---|
| 2a | polyamide from TA, | phosphinic acid from 2- | 20 | 1.09 | non-flammable |

TABLE 1-continued

| Example | Polymer | Flame retarding agent (FRA) | weight % FRA | compression molded plate RSV [dl/g] | Result according to ASTM D 635–68 |
|---|---|---|---|---|---|
|  | BN and ε-caprolactam | methyl-2,5-dioxo-1,2-oxaphospholane and 2,4,6-tribromoaniline |  |  |  |
| 2b | " | — | — | 1.15 | flammable |
| 3a | polyamide from TA, 1,3-BAC and ε-caprolactam | phosphinic acid from 2-methyl-2,5-dioxo-1,2-oxaphospholane and 2,4,6-tribromoaniniline | 15 | 0.98 | non-flammable |
| 3b | " | — | — | 1.23 | flammable |
| 4a | polyethylene | phosphinic acid from 2-methyl-2,5-dioxo-1,2-oxaphospholane and 2,4,6-tribromoaniline | 15 | 2.3[1) | non-flammable |
| 4b | " | — | — | 2.39[1) | flammable |
| 5a | polypropylene | phosphinic acid from 2-methyl-2,5-dioxo-1,2-oxaphospholane and 2,4,6-tribromoaniline | 15 | 2.14[1) | non-flammable |
| 5b | " | — | — | 2.23[1) | flammable |
| 6a | polyamide from TA, 1,3-BAC and AH salt | phosphinic acid from 2-methyl-2,5-dioxo-1,2-oxaphospholane and di-n-butylamine | 20 | 1.05 | non-flammable |
| 6b | " | — | — | 1.10 | flammable |
| 7a | polybutyleneterephthalate | phosphinic acid from 2-methyl-2,5-dioxo-1,2-oxaphospholane and 2,4,6-tribromoaniline | 10 | 0.84 | non-flammable |
| 7b | " | — | — | 0.89 | flammable |

TA = terephthalic acid;
AH salt = adipic acid-hexamethylene diamine salt;
BN = bisaminomethylnorbornane mixture;
1,3-BAC = 1,3-bisaminomethylcyclohexane;
RSV = reduced, specific viscosity, measured on a solution of 1 g of the polymer in 100 ml phenol/tetrachloroethane (60/40 weight %) at 25°C
[1) = measured on a solution of 0.1 g of polyolefin in 100 ml of decahydronaphthalene at 135°C

EXAMPLE 8

Polyethylene powder having a RSV of 2.7 dl/g (measured on a solution of 0.1 g of polyethylene in 100 ml of decahydronaphthalene at 135°C) and a MFI (melt flow index) $i_5$ (measured at 190°C) of 1.8 g/10' was blended with 5 weight % of the phosphinic acid of Example 1, homogenized in a double screw extruder and granulated. Sheets (thickness about 50 microns) were manufactured from the granules, which sheets resisted to the combustion test according to MVSS 302.

EXAMPLE 9

Polyethylene powder having a RSV of 2.9 dl/g (measured as indicated in Example 8) and a MFI $i_5$ (measured at 190°C) of 1.6 g/10' was blended with 7.5 weight % of the phosphinic acid of Example 1, homogenized in a double screw extruder and granulated. From these granules, small ribbons (thickness about 30 to 40 microns) were manufactured and drawn on a blow molding machine for producing blown films, which ribbons resisted to the combustion test according to DIN 53 806.

What is claimed is:
1. A polymer molding composition containing a flameproofing agent, wherein the flameproofing agent is a phosphinic acid or a salt thereof corresponding to the formulae

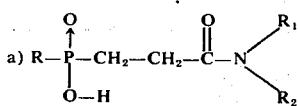

I or

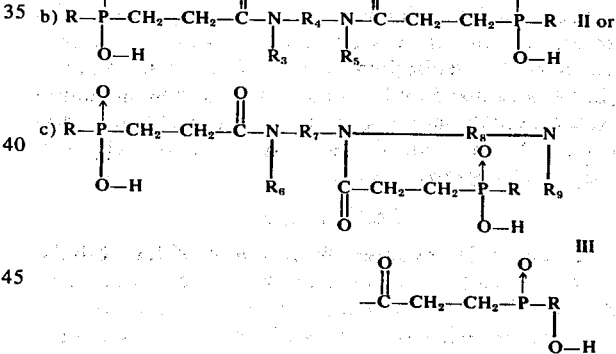

wherein
R is an alkyl radical having from 1 to 8 carbon atoms,
$R_1$ is hydrogen or an open-chain or cyclic alkyl radical having from 1 to 18 carbon atoms, which optionally contains halogen atoms, or an aryl or aralkyl radical optionally being substituted by halogen atoms,
$R_2$ is an open-chain or cyclic alkyl radical having from 1 to 18 carbon atoms, which optionally contains halogen atoms, or an aryl or aralkyl radical optionally being substituted by halogen atoms,
$R_3$ is hydrogen or an open-chain or cyclic alkyl radical having from 1 to 18 carbon atoms, which optionally contains halogen atoms,
$R_4$ is an open-chain alkylene radical having from 1 to 18 carbon atoms or a cyclic alkylene, arylene, arylalkylene, arylene-alkylene or arene-bisalkylene radical having from 1 to 6 carbon atoms in the alkylene radical, $R_5$, $R_6$, $R_9$ are as defined for $R_3$, and $R_7$ and $R_8$ are as defined for $R_4$;

the radicals $R_3$, $R_5$, $R_6$ and $R_9$ on the one hand, and $R_4$, $R_7$ and $R_8$ on the other hand being identical or different.

2. The polymer molding composition as claimed in claim 1, wherein the phosphinic acid is contained in an amount of from 1.5 to 40, preferably from 2 to 30, and especially from 2 to 25 weight %, calculated on the weight of the polymer.

3. The polymer molding composition as claimed in claim 1, wherein the phosphinic acid of formula I, in which R is a methyl radical, $R_1$ is hydrogen, and $R_2$ is a 2,4,6-tribromophenyl radical, is contained as flameproofing agent.

4.

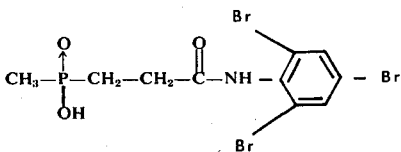

* * * * *